United States Patent [19]

Poeschl

[11] 4,313,420
[45] Feb. 2, 1982

[54] SOLAR HEATED BUILDING

[75] Inventor: Guenter Poeschl, Schwaikeim, Fed. Rep. of Germany

[73] Assignee: Helmut Lamm, Fed. Rep. of Germany

[21] Appl. No.: 103,203

[22] Filed: Dec. 13, 1979

[30] Foreign Application Priority Data

Dec. 20, 1978 [DE] Fed. Rep. of Germany ....... 2855154

[51] Int. Cl.³ .............................................. F24J 3/02
[52] U.S. Cl. .................................. 126/429; 126/428; 126/431; 126/444; 47/17
[58] Field of Search ............... 126/428, 429, 431, 432, 126/437, 444, 450; 98/33 A, 33 R, 32; 34/93; 47/17, 19

[56] References Cited

U.S. PATENT DOCUMENTS

| | | | |
|---|---|---|---|
| 3,080,875 | 3/1963 | Bartlett | 47/17 X |
| 3,446,272 | 5/1969 | Gaines, Jr. | 47/17 X |
| 3,691,929 | 9/1972 | Huling, Jr. | 98/33 A |
| 4,002,109 | 1/1977 | Hori et al. | 98/33 A X |
| 4,014,133 | 3/1977 | Brown | 47/17 |
| 4,060,195 | 11/1977 | Rapp, Jr. et al. | 126/427 X |
| 4,069,593 | 1/1978 | Huang | 34/93 |
| 4,128,124 | 12/1978 | Worthington | 126/427 X |
| 4,160,523 | 7/1979 | Stevens | 126/430 |

FOREIGN PATENT DOCUMENTS

| | | |
|---|---|---|
| 332058 | 10/1976 | Austria . |
| 2042114 | 6/1972 | Fed. Rep. of Germany . |
| 2058162 | 6/1972 | Fed. Rep. of Germany . |
| 2522791 | 12/1975 | Fed. Rep. of Germany . |
| 2304739 | 10/1976 | France . |
| 2335800 | 7/1977 | France . |
| 441858 | 1/1968 | Switzerland ......................... 47/17 |
| 606654 | 11/1978 | Switzerland . |
| 1170850 | 11/1969 | United Kingdom . |

OTHER PUBLICATIONS

"Solar Energy Utilization: Little Hope for Europe," Rouvel, Süddeutsche Zeitung, May 1974, pp. 7-9.

Primary Examiner—Larry Jones
Attorney, Agent, or Firm—Senniger, Powers, Leavitt and Roedel

[57] ABSTRACT

A solar heated building comprising a frame, an inner wall supported by the frame, and an outer wall of generally transparent material supported by the frame and spaced outwardly of said inner wall thereby defining a passage therebetween. The passage has an inlet for the flow of air into the passage and an outlet in communication with the interior of the building for flow of air from the passage into the interior of the building. The inner and outer walls are positioned for incidence thereon of solar radiant energy, whereby on flow of air through the passage the air may be heated by the solar radiant energy prior to flowing into the interior of the building.

19 Claims, 9 Drawing Figures

SOLAR HEATED BUILDING

BACKGROUND OF THE INVENTION

The invention relates to solar heated buildings, and more particularly to solar heated buildings of the type having a frame, and inner and outer walls supported on the frame, the walls defining passages for the flow of a heat transfer medium.

Reference may be made to German DE-OS No. 2,522,791 and *Suddeutsche Zeitung* No. 104, May 6, 1974, p. 7, "Solar Energy Use: Small Hope for Europe" showing buildings of this type in use as greenhouses, the inner and outer walls of the buildings being made of thermosetting plastic or glass and the heat transfer medium being a fluid such as water circulated in the passages between the walls. Ventilation means may be incorporated into the buildings, usually at the sides thereof, for enabling air to flow into and out of the buildings for ventilating and for regulating the temperature of the interior thereof. A disadvantage of the ventilation means is that when the ventilation means is opened in winter, cold air can flow directly into the buildings. Thus when such a building is used as a greenhouse, the cold air flows onto the plants and damages them. Similarly, if the building were used as shelter for a swimming pool, the cold air would flow directly into the building, thereby making at least some parts of the building uncomfortable. In addition, the ventilation means often comprises a long sheet of plastic material wound on a rotatably mounted shaft, the sheet being unwound and extending across openings in the buildings for blocking the flow of air. Problems with such ventilation means include its high heat loss and its inability to regulate air flow through each opening independently of that through the other openings.

SUMMARY OF THE INVENTION

Among the several objects of this invention may be noted the provision of a solar heated building of the above described type which has improved interior temperature regulation; the provision of such a building which has improved ventilation; the provision of such a building in which cold air from outside the building for ventilating the building may be heated by solar radiant energy or other sources of heat prior to flowing into the interior of the building; the provision of such a building which has insulated ventilation means; the provision of such a building which has ventilation means comprising a plurality of independently operable panels for blocking and unblocking air flow through openings in the building; the provision of such a building in which attachment of the inner and outer walls to the frame is effected in a quick, economical manner; and the provision of such a building which is usable as a warehouse, stall, greenhouse, bathhouse, tennis court, or any other type of structure in which the interior temperature must be regulated.

In general, a solar heated building of this invention comprises a frame, an inner wall supported by the frame, and an outer wall of generally transparent material supported by the frame and spaced outwardly of said inner wall thereby defining a passage therebetween, the passage having an inlet for flow of air into the passage and an outlet in communication with the interior of the building for flow of air from the passage into the interior of the building. The inner and outer walls are positioned for incidence thereon of solar radiant energy, whereby on flow of air through said passage the latter may be heated by said solar radiant energy prior to flowing into the interior of the building.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
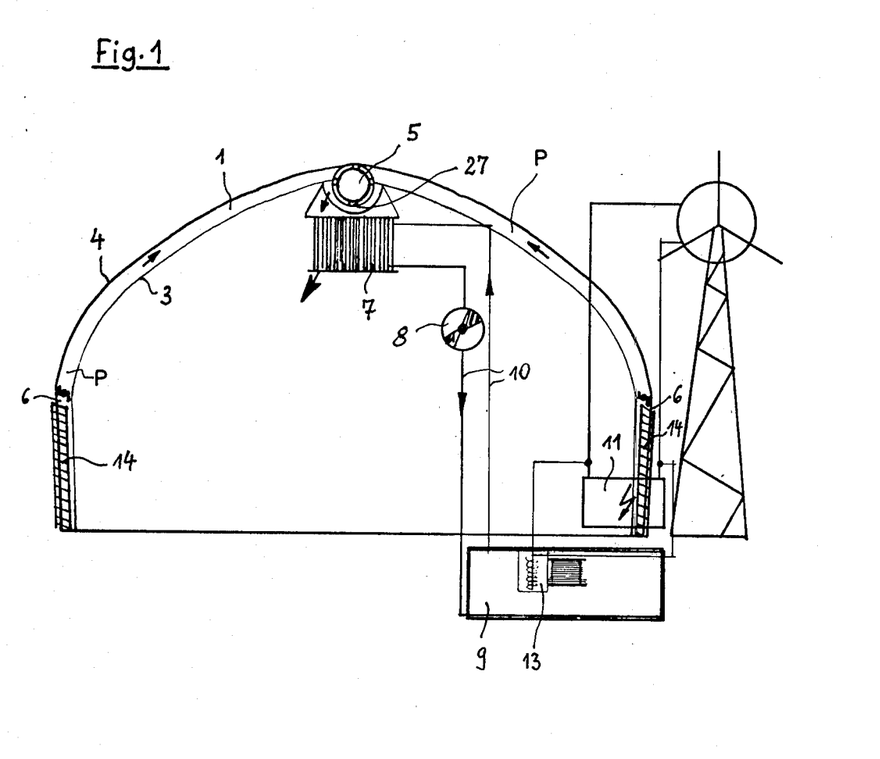
FIG. 1 is a schematic cross section of a building of this invention showing ventilation means at the sides thereof and passages between the inner and outer walls.

Referring to the drawings, a solar heated building of this invention in shown comprising a frame having a plurality of transversely extending structural members 1 of channel-shaped section spaced along the length of the building, the members being secured to each other by structural members 2 of a generally C-shaped section extending along the length of the house. Each transverse structural member 1 has a central portion, sides extending from the central portion, and two flanges 32, each flange extending outwardly from one of the sides and having a lip at an end thereof. The transverse structural members are bent lengthwise to form a parabola, the central portion of each member being at the outside of the building (see FIGS. 1 and 7).

Figure 8:
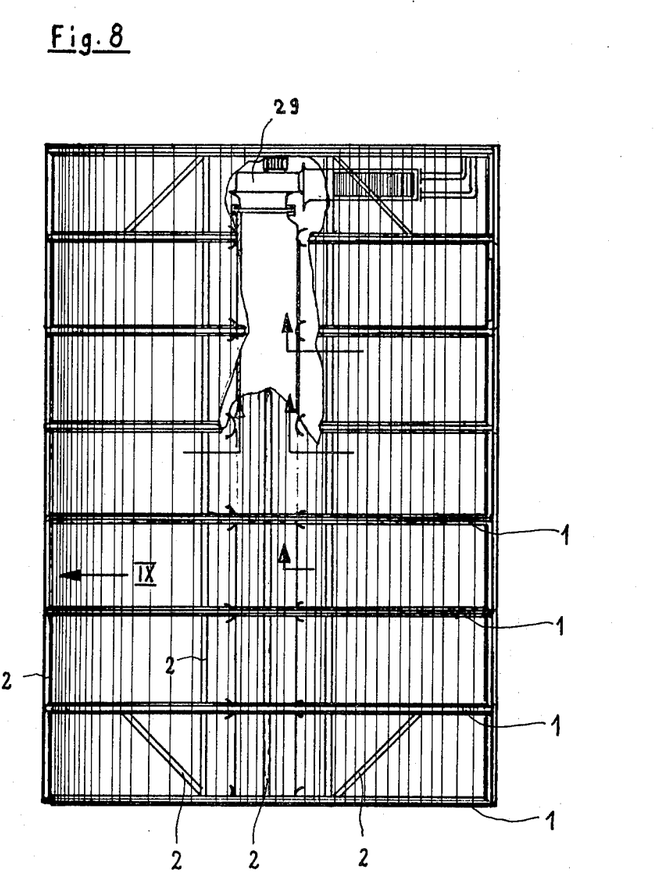
FIG. 8 is a top plan of the building, the frame being visible through the transparent outer wall.

Preferably, the inner wall 3, of the building comprises a sheet of tinted thermoplastic material stretched across the inside of the frame and secured to the flanges of the structural members 1 by means described in more detail hereinafter. The outer wall 4 comprises a sheet of generally transparent thermoplastic material stretched over the outside of the frame and secured to the central portion of the structural members 1. Thus, a plurality of passages P for the flow of air are formed between the individual structural members 1 and between the inner and outer walls, each passage having an inlet 6 for the flow of air into the passage and an outlet for flow of air into the interior of the building, the outlet being in communication with the interior of the building via a manifold 5 having an outlet port 27 at an end thereof. The manifold 5 comprises a length of tubing or duct extending the length of the building supported by a longitudinal member 2 secured to the underside of the transverse structural members 1 (see FIG. 8).

The outer wall 4 and the inner wall 3 are positioned for incidence of solar radiant energy thereon so that on entry of air into the passages P through the inlets 6, the air is heated in the passages by means of the solar radiant energy. Convection causes the heated air to rise in the passage and to enter the manifold 5 from whence it flows through a heat exchanger 7. A heat transfer medium such as water is circulated by pump means 8 (or by convection, if no pump is available) up from a heat accumulator 9 to the heat exchanger 7 where heat is transferred between the air and the water, and back down to the heat accumulator 9 where heat from the water is stored. The heat accumulator and heat exchanger 7 thus form a heat transfer system 10. When the interior of the building is to be heated but the level of solar radiant energy incident on the building is insufficient to effect proper heating of the air in the passages P, the heat transfer system 10 may be operated so as to transfer heat stored in the accumulator 9 to the air flowing into the building. To transfer heat to the air, hot water from the accumulator 9 is pumped up to the heat exchanger 7 while air is drawn past the heat exchanger through the passages and manifold 5 by the blower 29, the air being heated at the heat exchanger before entering the interior of the building.

It is contemplated that the building may be provided with an auxiliary heating means such as electrical resistance heating element 13 in the heat accumulator 9. A generator and battery both designated as 11 (see FIG. 1) may be provided to supply power to the heater 13. Preferably, the generator is driven by a wind collector for charging the battery. When the battery is fully charged power is transferred automatically by an electric regulating device (not shown) to the heater 13 thereby heating the water. Alternatively, the heater 13 is supplied with electrical power from an outside power network.

The ventilation means comprises a plurality of openings in the inner and outer walls 3, 4 in the side of the building, and means for blocking and unblocking flow of air from outside the building into the building through said openings. The blocking means comprises a plurality of collapsible panels 14, one in each of the openings in the outer wall. The panels 14 are of double wall construction, each panel having a first and second wall 15, 16 of thermoplastic sheet material preferably held apart in spaced relation by means such as ribs 17. Each opening in the outer wall 4 has a top and sides and each panel 14 has sides extending along the sides of the respective opening and an upper end engageable with the top of the respective opening when the panel is fully extended for blocking flow air through the opening into the building. The ventilation means further comprises means for holding the panels in extended condition such as a length of line 18 attached to the upper end of each panel 14 and led past sets of upper and lower pulleys 19, 20 rotatably mounted to the inner side of the frame to an activating mechanism, such as a winch (not shown). The line 18 enables movement of the upper end of each panel toward and away from the top of the respective opening. As the upper end of the panel moves away from the top of the opening, the panel 14 collapses in an accordion-like manner.

Figures 2, 3:
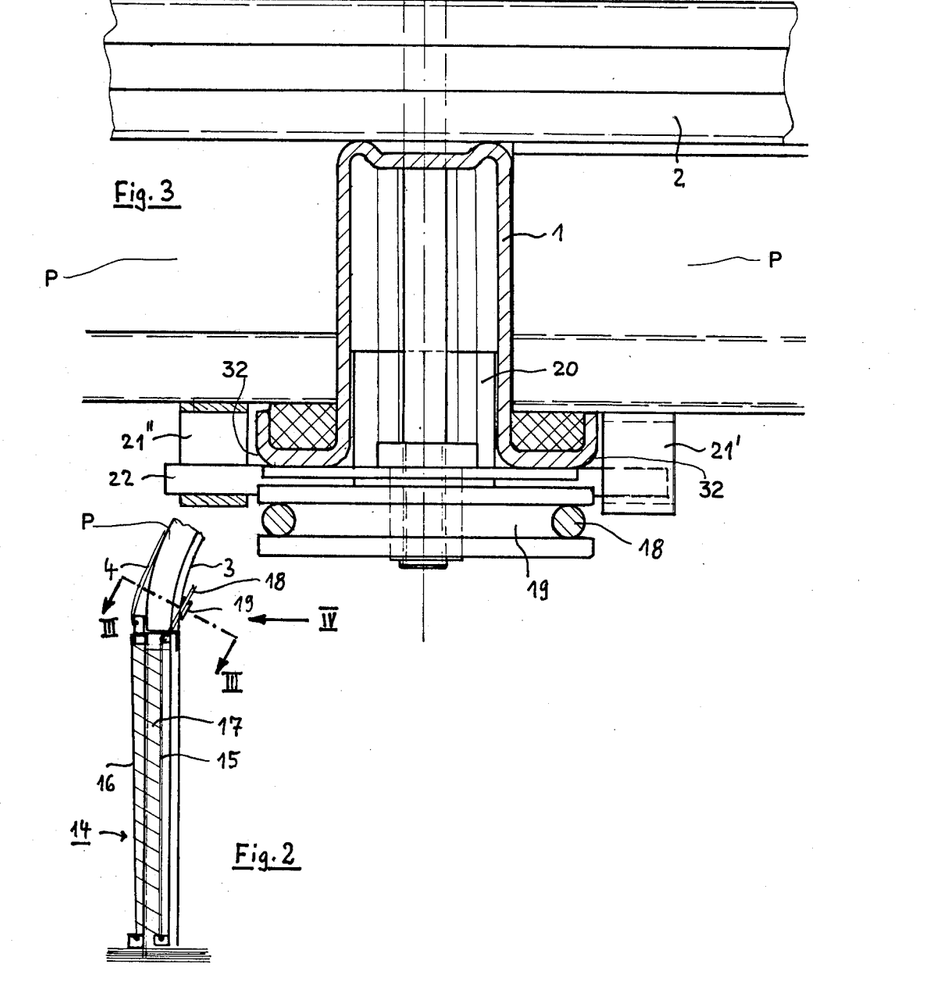
FIG. 2 is a vertical section of the ventilation means at one side of the building.
FIG. 3 is an enlarged section of the building on line III—III of FIG. 2.
Figure 4:
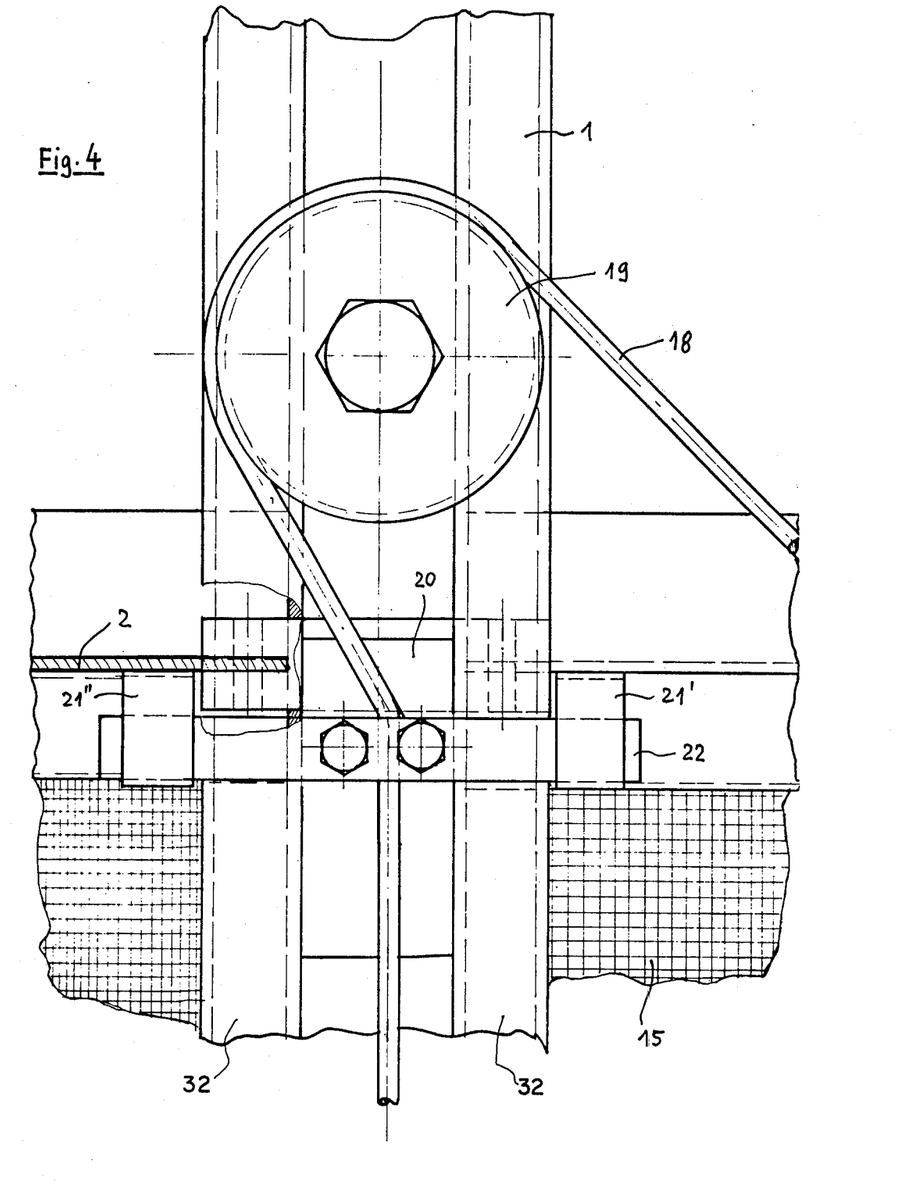
FIG. 4 is an enlarged interior side elevation of the building along arrow IV of FIG. 2.
Figure 9:
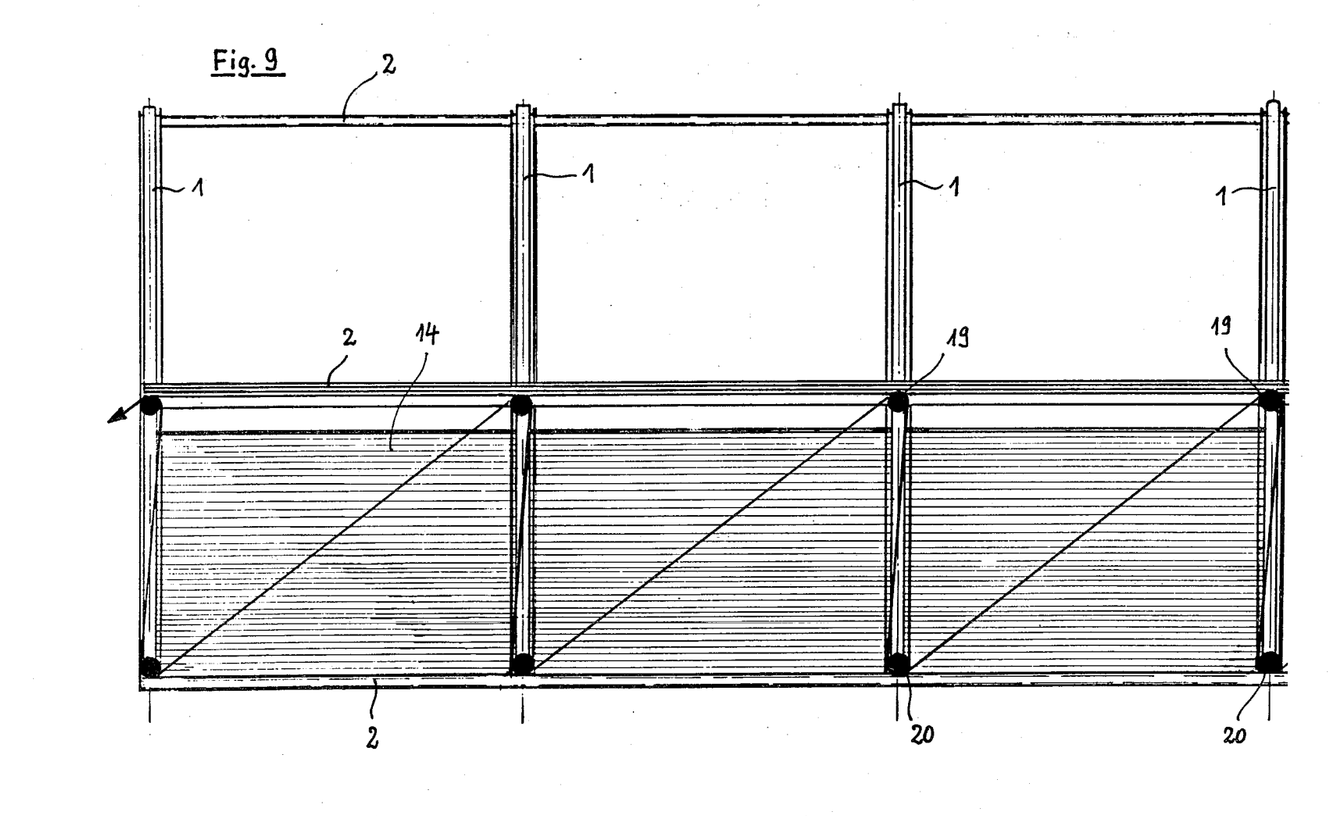
FIG. 9 is an interior side elevation of the building along arrow IX of FIG. 8.

As shown in FIGS. 3 and 4, each panel 14 is detachably secured to the line 18 by means of rings 21' and 21" secured to the panel at an upper corner thereof and each adapted to receive a crossbar 22, the crossbar being secured to the line 18 and to a vertically movable guide member 20 in sliding engagement with the sides of one of the transverse structural members 1. With all the panels 14 at the side of the building detachably secured to the line 18, the upper ends of the panels can be simultaneously raised and lowered as shown in FIG. 9. Alternatively, one or more of the panels may be detached from the line 18 and supported in extended condition on the frame by means (not shown), so that only predetermined panels are moved between open and closed positions by the line 18.

Figure 5:
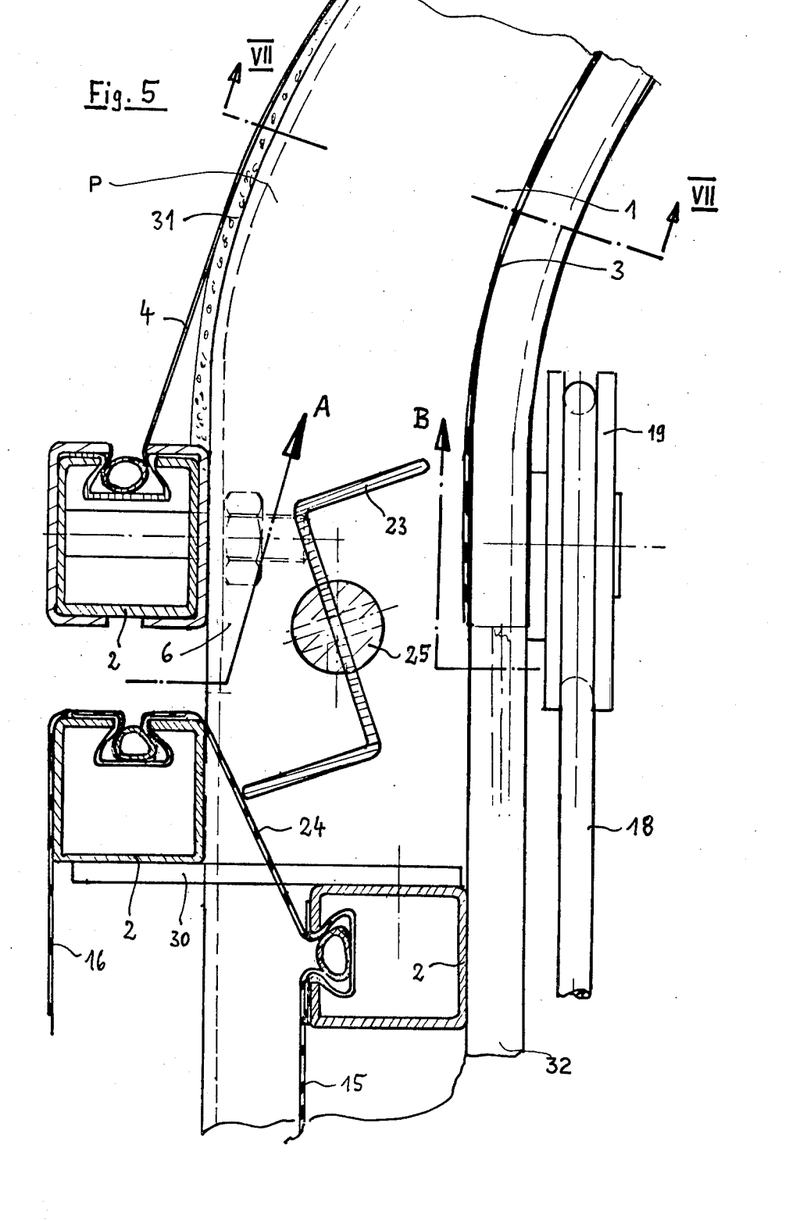
FIG. 5 is a vertical section of the ventilation means in open position.
Figure 6:
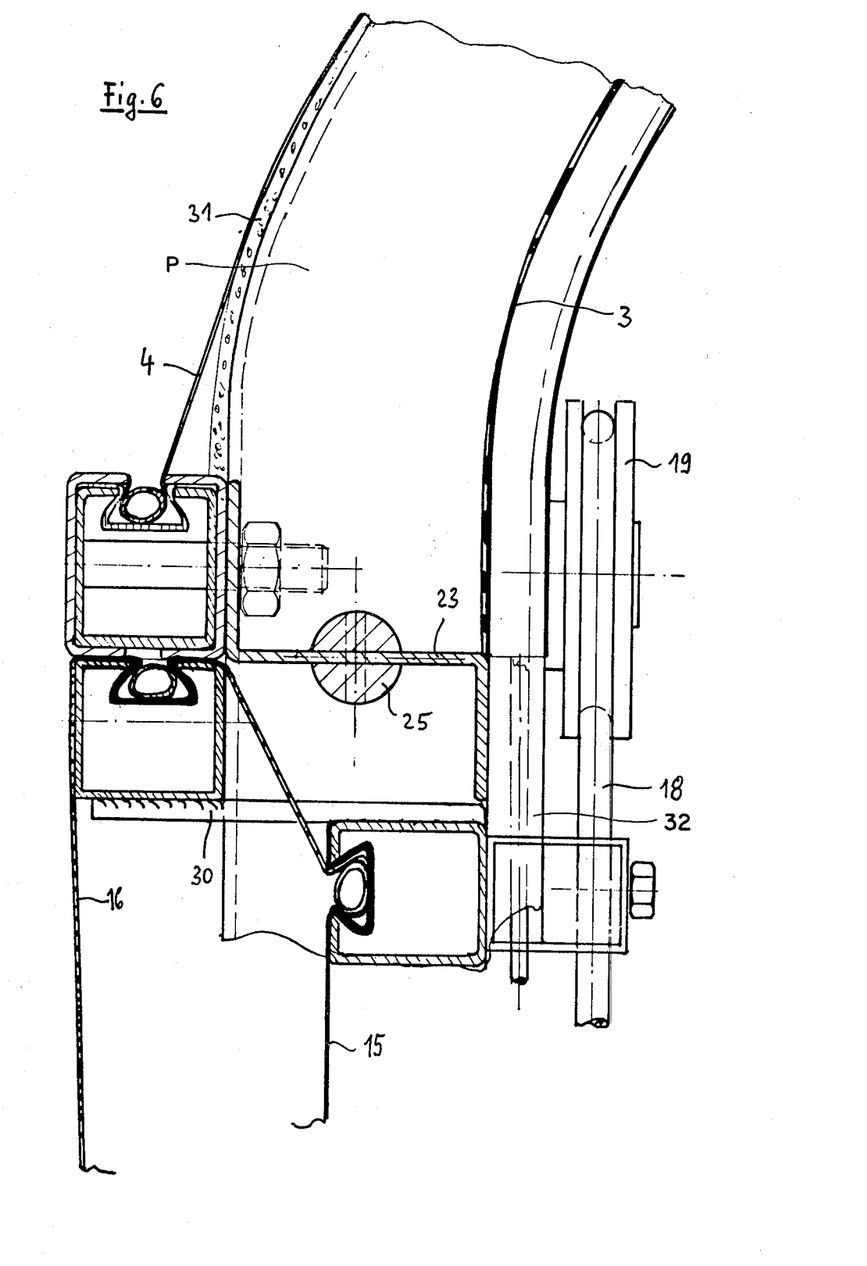
FIG. 6 is a vertical section similar to FIG. 5, but showing the ventilation means in closed position.

One of the passages P is disposed above each panel 14, the inlet 6 thereof being in communication with the respective openings in the inner and outer walls as shown in FIGS. 5 and 6, for receiving air from inside and outside the building. The inlet 6 is bounded underneath by a sheet of plastic material 24 leading from the first wall 15 to the second wall 16 of the panel 14. The sheet 24 is stretched taut between two panel members which are rigidly joined by a strap 30, and extends between the transverse structural members 1. Valve means is provided at each inlet 6, each valve means comprising a movable valve member 23 of generally Z-shaped section received in inlet, and a shaft pivotally mounted on the frame, the movable valve member 23 being secured to the shaft for pivotal movement between open and closed positions.

As shown in FIG. 6 with both the valve member 23 and the panel 14 at inlet 6 in their respective closed positions, the flow of air through the ventilation means and the passage P is blocked. With the valve member and panel in open position as shown in FIG. 5, air can enter the passages via inlet 6 from the interior of the building in the direction of arrow B, and from outside the building in the direction of arrow A. This enables cold air entering the inlet 6 from outside the building to be mixed with warm air from the interior of the building so that the air circulated back into the interior of the building via passage P and manifold 5 is warmed even in the absence of solar radiation. If valve member 23 is moved clockwise away from the position shown in FIG. 5, entry of air from the interior of the building to the passage is blocked, while air from the outside of the building is allowed to enter the passage. Preferably, the valve member is pivoted to such a moved position when there is a high level of solar radiant energy. With the valve member 23 in open position as shown in FIG. 5 and with the upper end of the panel 14 moved up from the position shown in FIG. 5 to a completely closed position, air can only flow from the interior of the building into passage P. Lastly, if the upper end of the panel is lowered below the position shown in FIG. 5, air can flow directly through the openings in the inner and outer walls into and out of the interior of the building.

Figure 7:
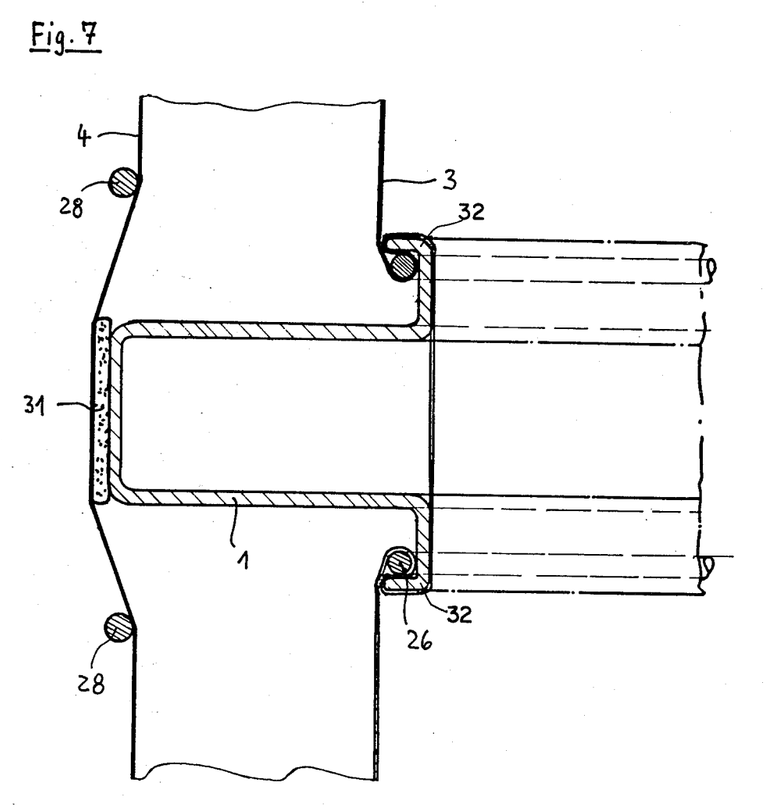
FIG. 7 is a section on line VII—VII of FIG. 5, showing the attachment of the inner and outer walls to the frame.

As shown in FIG. 7 the outer wall 4 is laid across the transverse structural members 1 and is made taut by means of plastic lines 28 drawn across the outside of the wall 4. The outer wall 4 is protected against mechanical or thermal damage by a foam rubber strip 31 between the outer wall and the transverse members 1. The inner wall, as shown in FIG. 7, is fastened to the flanges 32 of the transverse members 1 by means of lines 26. During assembly the inner wall 3 is placed loosely against the inner surface of the flanges and secured to the lips of the flanges by the lines 26 in a manner similar to the way the tire of a bicycle wheel is secured to a rim.

In view of the above, it will be seen that the several objects of the invention are achieved and other advantageous results attained.

What is claimed is:

1. A solar heated building comprising;
a frame;
an inner wall supported by the frame;
an outer wall of generally transparent material supported by the frame and spaced outwardly of said inner wall thereby defining a passage therebetween;
said passage having an inlet for flow of air into the passage and an outlet in communication with the interior of the building for flow of air from the passage into the interior of the building;
said inner and outer walls being positioned for incidence thereon of solar radiant energy, whereby on flow of air through said passage the latter may be heated by said solar radiant energy prior to flowing into the interior of the building;
ventilation means comprising an opening in the outer wall, an opening in the inner wall, and means for blocking and unblocking flow of air from outside the building into the building through said openings, said inlet being in flow communication with said openings in the inner and outer walls; and
valve means at said inlet movable through a series of positions and being so sized and configured relative to said inlet and said ventilation means as to block flow of air from both the interior and the exterior of the building into the passage when in a first position, to enable flow of air only from the exterior of the building into the passage when in a second position, to enable flow of air only from the interior of the building into the passage when in a third position, and to enable flow of air from both the interior and the exterior of the building into the passage when in a fourth position.

2. A solar heated building as set forth in claim 1 wherein the valve means comprises a movable valve member of generally Z-shaped section.

3. A solar heated building as set forth in claim 1 further comprising a heat exchanger, a heat accumulator, and means for circulating a heat transfer medium through the heat exchanger and the heat accumulator, the heat exchanger being adapted to transfer heat between the air flowing into the interior of the building and the heat transfer medium.

4. A solar heated building as set forth in claim 3 further comprising an auxiliary heating means for supplying heat to the heat transfer medium.

5. A solar heated building as set forth in claim 1 wherein said inlet is adjacent the bottom of the building and said outlet is adjacent the top of the building, the air rising toward the outlet as it is heated in the passage.

6. A solar heated building as set forth in claim 1 wherein the outer wall comprises a sheet of generally transparent thermoplastic material, the inner wall comprises a sheet of tinted thermoplastic material, and the frame comprises a plurality of elongate structural members, the inner and outer walls being releasably secured to the structural members and defining a plurality of said passages.

7. A solar heated building as set forth in claim 6 wherein the structural members have flanges extending therealong at the inside of the frame, the inner wall being secured to the structural members at said flanges.

8. A solar heated building as set forth in claim 6 further comprising a plurality of said openings in the inner and outer walls, and wherein the inlet of each of said passages is adjacent one of said openings in the outer wall and one of said openings in the inner wall, the inlet of each of passage being adapted to receive air from inside and outside of the building.

9. A solar heated building as set forth in claim 8 further comprising a manifold at the top of the building in communication with the interior of the building and with the passages via their outlets.

10. A solar heated building as set forth in claim 9 further comprising a heat exchanger, a heat accumulator, and means for circulating a heat transfer medium through the heat exchanger, the heat exchanger being adapted to transfer heat between air flowing from the manifold and the heat transfer medium.

11. A solar heated building as set forth in claim 10 further comprising a blower for drawing air through the passages and manifold and discharging it into the interior of the building.

12. A solar heated building comprising;
a frame;
an inner wall supported by the frame;
an outer wall of generally transparent material supported by the frame and spaced outwardly of said inner wall thereby defining a passage therebetween;
said passage having an inlet for flow of air into the passage and an outlet in communication with the interior of the building for flow of air from the passage into the interior of the building;
said inner and outer walls being positioned for incidence thereon of solar radiant energy, whereby on flow of air through said passage the latter may be heated by said solar radiant energy prior to flowing into the interior of the building; and
ventilation means comprising an opening in the outer wall, an opening in the inner wall, and means for blocking and unblocking flow of air from outside the building into the building through said openings,
said blocking and unlocking means comprising a collapsible panel at the opening in the outer wall and means for holding the panel in extended condition, the panel when fully extended blocking flow of air through the opening in the outer wall into the building.

13. A solar heated building as set forth in claim 12 wherein the opening in the outer wall has a top and sides, and wherein the panel has sides extending along the sides of the opening and an upper end engageable with the top of the opening when the panel is fully extended.

14. A solar heated building as set forth in claim 13 wherein the panel is of double wall construction and wherein the holding means comprises a pulley mounted on the frame above the panel, and a length of line connected to the panel at its upper end and fed over the pulley, the line being adapted to raise and lower the upper end of the panel relative to the top of the opening in the outer walls.

15. A solar heated building as set forth in claim 14 wherein the outer wall comprises a sheet of generally transparent thermoplastic material, the inner wall comprises a sheet of tinted thermoplastic material, and the frame comprises a plurality of elongate structural members, the inner and outer walls being releasably secured to the structural members and defining a plurality of said passages.

16. A solar heated building as set forth in claim 15 wherein the structural members have flanges extending therealong at the inside of the frame, the inner wall being secured to of the structural members at said flanges.

17. A solar heated building as set forth in claim 16 further comprising a plurality of said openings in the inner and outer walls and a plurality of said collapsible panels, one panel for each opening in the outer wall.

18. A solar heated building as set forth in claim 17 further comprising a plurality of said pulleys, one for each panel, said length of line being fed over said pulleys and connected to said panels at intervals along its length, whereby the upper ends of the panels may be moved simultaneously.

19. A solar heated building as set forth in claim 18 wherein the inlet of each of said passages is adjacent one of said openings in the outer wall and one of said openings in the inner wall, the inlet of each of passage being adapted to receive air from inside and outside of the building.

* * * * *